United States Patent Office 3,217,166
Patented Nov. 9, 1965

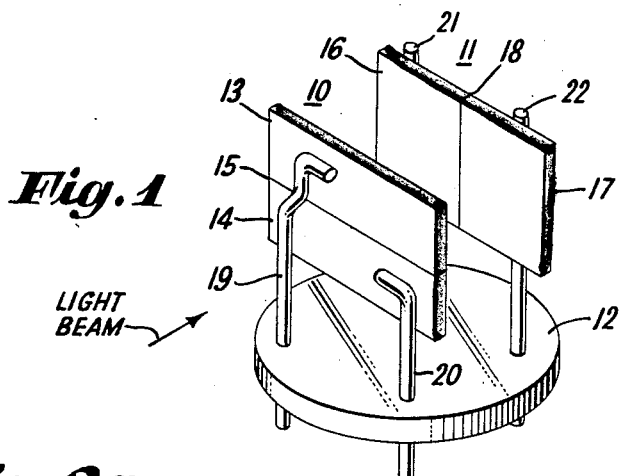
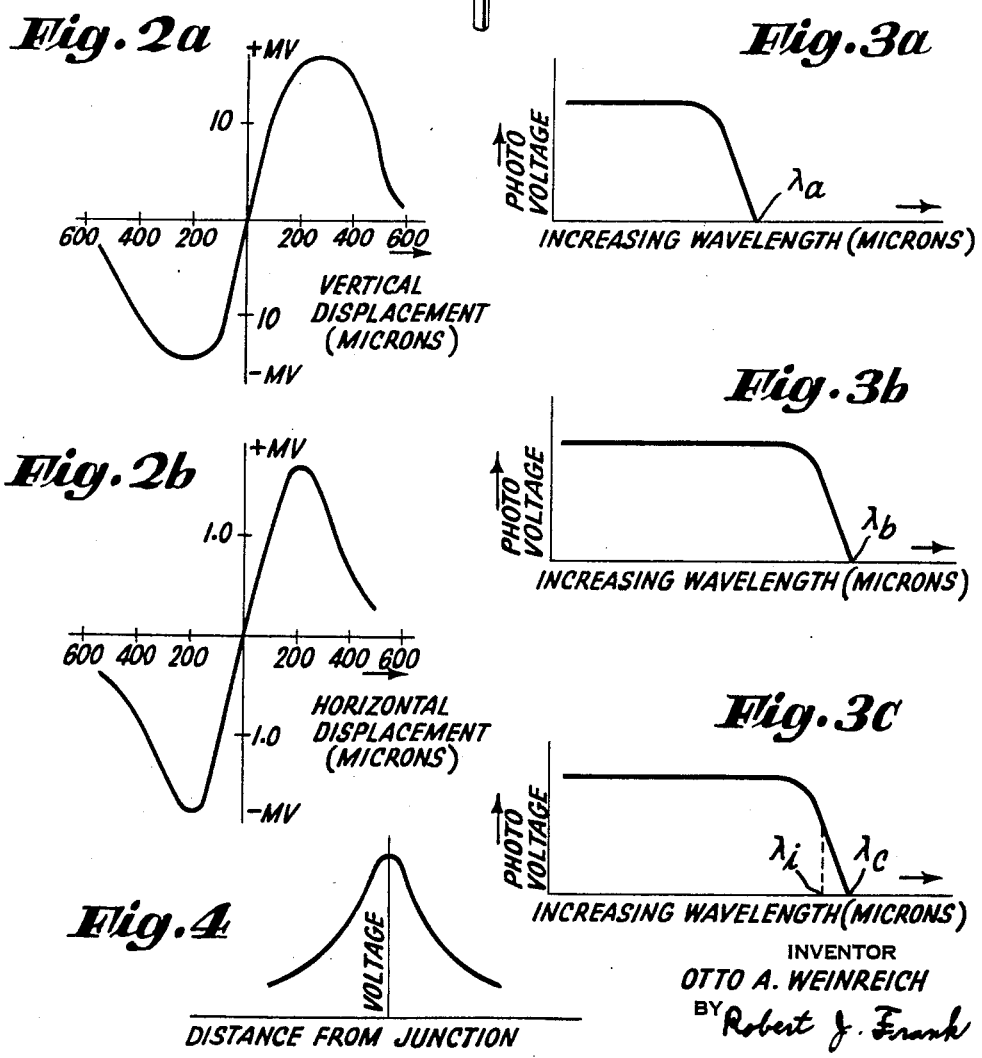
INVENTOR
OTTO A. WEINREICH
BY Robert J. Frank
AGENT

3,217,166
PHOTOSENSITIVE SEMICONDUCTOR JUNCTION DEVICE HAVING A TWO-DIMENSIONAL RESPONSE
Otto A. Weinreich, East Orange, N.J., assignor to Sylvania Electric Products Inc., a corporation of Delaware
Filed Feb. 26, 1960, Ser. No. 11,226
4 Claims. (Cl. 250—203)

This invention relates to photoelectric devices.

In copending patent application Serial No. 717,776, filed February 26, 1958 by H. F. Mataré and Otto A. Weinreich, and now abandoned there is described a bicrystal detector, or photocell, comprising a wafer formed from two joined semiconductor crystals having an extremely thin common interface. The interface consists of a grain boundary which is of a different conductivity type than either of the two crystals. The crystals may, for example, both be of the N conductivity type while the grain boundary may be of the P type. Electrical contacts equidistantly spaced from the interface are secured to opposite ends of the wafer.

When a light beam strikes the edge of the interface both contacts are found to be at the same potential. When the light beam is moved slightly off the interface toward the first contact, a voltage of one polarity is produced between the contacts; and when the beam is moved slightly off the interface toward the second contact, a voltage of the opposite polarity is produced between the contacts. The displacement sensitivity of this device is very good, sensitivities as high as 10 millivolts per micron having been obtained.

While a single photocell of this type may be used to detect the presence of a source of radiation, it can not be readily employed to determine the precise direction to the source. Accordingly, it is an object of this invention to provide an improved photoelectric device which may be used to accurately determine the direction to a source of radiant energy.

Another object is to provide a photoelectric device having a two-dimensional response in which a single beam of radiant energy produces photovoltages corresponding to the direction to the source of energy.

Still another object is to provide a stable zero-center photoelectric device using a pair of semiconductor detectors to determine the direction to a source of radiant energy.

A further object is to provide a photoelectric device using two photocells wherein the photocells are optically connected but electrically isolated.

A still further object is to provide a compact photoelectric device using two semiconductor detectors wherein the cells may be composed of the same or of different materials.

In the present invention, first and second detectors are mounted with their surfaces parallel and spaced a finite distance apart. The second detector is located directly behind the first detector, radiation striking it only after passing through the first detector. Each of the detectors is composed of semiconductor materials and is divided into one or more contiguous, transverse zones of different conductivity. The boundaries between zones of different conductivity in the first detector are oriented along a first axis while the boundaries between zones of different conductivity in the second detector are oriented along a second axis perpendicularly situated with respect to the first axis.

In general, when a beam of radiation composed of different frequencies strikes a bicrystal of the type described in the aforementioned copending application Serial No. 717,776, part of this radiation is absorbed, part transmitted through the detector, and part reflected from its surface. If the beam impinges directly on the interface both ends of the detector assume the same potential. If the beam strikes on either side of this boundary a voltage is produced having a polarity and magnitude corresponding to the linear displacement of the beam from the interface.

The wavelengths of radiation which are absorbed by the first detector and produce a photovoltage are determined by the value of the absorption edge of the material comprising the first detector. The absorption edge may be defined as the wavelength at which the radiation absorption is sharply reduced from its value at shorter wavelengths. Substantially all of the unreflected energy contained in wavelengths lower than the absorption edge is absorbed by the first detector material; longer wavelengths are transmitted through the first detector.

In one embodiment of the invention, a semiconductor material is selected for the second detector having a lower energy gap, and therefore a higher absorption edge, than that of the material comprising the first detector. The energy gap is defined as the energy range between the bottom of the conduction band and the top of the valence band of the semicondctor. Wavelengths longer than the absorption edge of the first detector and shorter than the absorption edge of the second detector are transmitted through the first detector to the second detector and absorbed. As in the case of the first detector, both ends of the second detector assume the same potential if the beam strikes directly on its interface. If the beam falls on either side of the interface, a voltage having a polarity and magnitude corresponding to the displacement of the beam from the interface is produced. Since the interfaces of the first and second detectors are at right angle to each other, the direction of the radiation source will lie along the intersection of planes passing through the two interfaces.

In another embodiment of the invention, both of the detectors are formed of the same material. However, the first detector is made thin enough so that radiation having an energy level higher than the gap energy is only partly absorbed, the balance of the unreflected and unabsorbed energy being transmitted through the first detector and absorbed by the second detector. The impinging radiation need not be monochromatic but must contain wavelengths near the absorption edge of the detector where the absorption coefficient is reasonably low. In addition, it may be desirable to establish a temperature difference between the second detector and the first detector, the temperature of the second detector being higher than that of the first detector. This increases the energy gap of the first detector with respect to the second and spreads the absorption edges of the two detectors.

While the use of bicrystal detectors is usually preferable because of their extremely high displacement sensitivity and change in polarity as the beam traverses the boundary, P-N junctions may also be used in my invention. Conventional P-N junction semiconductors generally have lower displacement sensitivity than the bicrystal device and the photovoltage produced at the junction passes through a maximum rather than a null. However, in many applications they are highly satisfactory when used in direction indicating devices.

The above objects of and the brief introduction to the present invention will be more fully understood and further objects and advantages will become apparent from a study of the following description in connection with the drawings, wherein:

FIG. 1 is a perspective view of a photoelectric device constructed in accordance with my invention;

FIGS. 2a and 2b are graphs illustrating the voltage response curves obtained when bicrystal photocells are used as detectors in the photoelectric device of FIG. 1;

FIGS. 3a, 3b and 3c are graphs showing the relationship between photovoltage and wavelength for the detectors of FIG. 1; and, FIG. 4 is a graph showing the voltage response curve obtained from a P-N junction photocell used as a detector in the photoelectric device of FIG. 1.

Referring to FIG. 1, there is shown first and second photocells 10 and 11 mounted on a supporting base 12. Photocell 10 consists of an integral semiconductor wafer having two portions 13 and 14 divided by an extremely thin boundary 15 extending along a horizontal axis. Similarly photocell 11 comprises an integral semiconductor wafer having two portions 16 and 17 divided by a boundary 18 extending along a vertical axis.

Portions 13 and 14 of photocell 10 are preferably formed from N type semiconductor crystals having, for example, 100 axes which intersect at an acute angle. The plane formed by the intersection of these axes constitutes the boundary 15 and is defined as a grain boundary. In germanium, the grain boundary 15 is inherently of a P type conductivity, portions 13 and 14 being of the N type. Crystals 13 and 14 may be formed from P type material (in which case the grain boundary 15 would exhibit P+ conductivity) but the photoelectric effect is much less pronounced. Similarly, portions 16 and 17 of photocell 11 are preferably formed from N type crystals, having a P type grain boundary 18.

First and second ohmic contacts 19 and 20 are secured to portions 13 and 14 respectively of photocell 10 at equal distances from the horizontal boundary 15. Similarly, ohmic contacts 21 and 22 are attached to portions 16 and 17 respectively of photocell 11 at equal distances from the vertical boundary 18.

When a light beam strikes photocell 10, a voltage is produced across contacts 19 and 20 corresponding to the vertical displacement of the beam from the horizontal boundary 15. The light which is transmitted through photocell 10 and absorbed by photocell 11 produces a voltage across contacts 21 and 22 corresponding to the horizontal displacement of the beam from the vertical boundary 18. When the photoelectric device is oriented in a position where the voltages across contacts 19, 20 and 21, 22 are both at their null points, the light source will be located in front of photocell 10 along a line formed by the intersection of planes passed through boundaries 15 and 18.

FIG. 2a depicts the voltage across photocell 10 as a function of the vertical displacement of the light beam from the boundary 15 while FIG. 2b shows the voltage across photocell 11 as a function of the horizontal displacement of the light beam from the boundary 18. The voltage polarity reversals occuring at the boundaries and the steep slope of the voltage-displacement curves permit extremely high accuracy in locating the direction of the light source. It shall be noted that, in the example shown, the ratio of the voltage across photocell 10 to that across photocell 11 is approximately 10 to 1. This occurred because less light reached photocell 11 than impinged on photocell 10 but the accuracy and utility of the device was not reduced, a sharp null being obtained for both cells.

FIGS. 3a and 3b show the relationship between the wavelength of the incident light and the photovoltage of photocells 10 and 11 respectively when different materials are used for each photocell. The semiconductor material selected for photocell 10 has an energy gap which is higher than the energy gap of the material selected for photocell 11. This corresponds to a lower absorption edge $\lambda a$ (FIG. 3a) for photocell 10 than the absorption edge $\lambda b$ (FIG. 3b) inherent in the material comprising photocell 11. Thus, light wavelengths up to approximately $\lambda a$ will be absorbed by photocell 10, higher wavelengths being transmitted to photocell 11. The light absorbed by photocell 11 lies in the wavelength range $\lambda a$ to $\lambda b$, photocell 11 being transparent to wavelengths higher than $\lambda b$. For example, photocell 10 may be formed from silicon bicrystals having an energy gap of 1.1 electron volts which corresponds to an absorption edge of about 1.1 microns. Photocell 11, on the other hand, may be composed of germanium having an energy gap of 0.78 electron volt and an absorption edge of about 1.6 microns. In this case light having wavelengths up to about 1.1 microns will generate a photovoltage across photocell 10, and light of wavelengths between approximately 1.1 and 1.6 microns will generate a photovoltage across photocell 11.

Listed below are some of the semiconductor materials which may be used for photocells 10 and 11 together with their energy gaps in electron volts and absorption edges in microns.

| Material | Energy Gap (e.v.) | Absorption Edge (microns) |
| --- | --- | --- |
| Gallium phosphide | 2.40 | 0.51 |
| Cadmium selenide | 1.74 | 0.71 |
| Cadmium telluride | 1.50 | 0.82 |
| Gallium arsenide | 1.35 | 0.91 |
| Indium phosphide | 1.25 | 0.99 |
| Gallium antimonide | 0.70 | 1.76 |
| Indium arsenide | 0.35 | 3.52 |
| Lead selenide | 0.22 | 5.60 |
| Mercury telluride | 0.02 | 61.5 |

It is not essential that photocells 10 and 11 be made of different materials. This is due to the fact that the absorption edge is not abrupt but covers a certain wavelength range. Photocell 10 may be made thin enough so that light of energy near the absorption edge is only partly absorbed by the cell. Thus, if light containing wavelengths near the absorption edge is incident on photocell 10, part will be absorbed and part transmitted to photocell 11. This is shown in FIG. 3c where the incident light has a wavelength $\lambda i$ near the absorption edge $\lambda c$ of the material comprising both photocells. It has been found that substantially equal voltage outputs are obtained from both photocells if germanium is used for both cells, a monochromatic light beam having a wavelength $\lambda i$ of about 1.55 microns is incident on the device, and if photocell 10 has a thickness of about 8 microns.

The photoelectric device of FIG. 1 may also be operated using photocells of the same material by cooling photocell 10 or, conversely, heating photocell 11 to spread the absorption edges of the two cells. The position of the device is then adjusted until null voltages are obtained across both photocells.

While the detailed description thus far has related to the use of bicrystal semiconductors for photocells 10 and 11, P-N junction devices may also be used for this purpose. FIG. 4 depicts the voltage output obtained from a P-N junction photocell as a function of the displacement of the incident light beam from the junction. Since there is only a single transition from P to N material in the P-N junction, there is no change in the polarity of the photovoltage as the beam traverses the boundary. In operation, the direction of a light source would be determined by orienting the photoelectric device until the voltages across contacts 19, 20 and 21, 22 are each at a maximum.

A significant feature of this invention is that a photoelectric device has been provided which has a two-dimensional response, is compact, and is extremely precise. Although the distance between photocells 10 and 11 has been illustrated in FIG. 1 as several times the thickness of the individual detectors in order to show the invention more clearly, still more precise measurement and smaller size may be achieved by mounting the photocells closer together. With a spacing of 0.5 mil and a photocell thickness of 3 mils, excellent results have been achieved. Thin mica frames (not shown) which do not touch the boundary regions 15 and 18 are suitable for this purpose. Another important feature of this invention is that, although the photocells are optically coupled, they are not electrically connected. Thus, cross coupling between the two detectors is avoided.

What is claimed is:

1. A photoelectric device comprising first and second spaced substantially parallel detectors each composed of a P-N junction, the P-N junction of said first detector being perpendicular to the P-N junction of said second detector, said second detector being located directly behind said first detector, radiation striking the surface of said second detector only after passing through said first detector, and first and second pairs of contacts, said first pair of contacts being affixed to said first detector on opposite sides of and equidistant from the P-N junction of said first detector, and said second pair of contacts being affixed to said second detector on opposite sites of and equidistant from the P-N junction of said second detector.

2. A photoelectric device comprising a first detector composed of first and second semiconductor portions, said first detector generating a voltage corresponding to the displacement of received radiation from the boundary between said first and second semiconductor portions, a second detector spaced from said first detector and composed of third and fourth semiconductor portions, said second detector generating a voltage corresponding to the displacement of received radiation from the boundary between said third and fourth semiconductor portions, the boundary between said third and fourth semiconductor portions lying in a plane substantially perpendicular to the plane of the boundary between said first and second semiconductor portions, said second detector being located directly behind said first detector, radiation striking the surface of said second detector only after passing through said first detector, and electrical contact means affixed to said first, second, third and fourth semiconductor portions.

3. A photoelectric device as defined in claim 2 wherein said first detector absorbs radiation having wavelengths not exceeding a first predetermined value and transmits radiation of wavelengths higher than said first predetermined value, and wherein said second detector absorbs the radiation transmitted through said first detector, the wavelengths of the radiation absorbed by said second detector not exceeding a second predetermined value.

4. The method of determining the direction of a radiation source using first and second photodetectors composed of the same material and having first and second transverse boundaries comprising the steps of establishing a temperature difference between said first and second photodetectors, the temperature of said first photodetector being lower than that of said second photodetector, measuring the voltage generated by said first photodetector, adjusting the position of said first photodetector until said radiation impinges thereon and the voltage across said first photodetector is at a null; measuring the voltage generated by said second photodetector; adjusting the position of said second photodetector until the radiation transmitted through said first photodetector impinges thereon, the transverse boundary of said second photodetector is perpendicular to the transverse boundary of said first photodetector, and the voltage across said second photodetector is at a null; the direction of the source of radiation lying within the intersection of the planes of said first and second transverse boundaries.

References Cited by the Examiner
UNITED STATES PATENTS

| | | | |
|---|---|---|---|
| 2,641,712 | 6/53 | Kircher | 250—211 X |
| 2,949,498 | 8/60 | Jackson | 250—211 X |
| 2,953,621 | 9/60 | Schultz | 250—211 X |
| 3,028,500 | 4/62 | Wallmark | 250—203 X |

RALPH G. NILSON, *Primary Examiner.*

RICHARD M. WOOD, WALTER STOLWEIN,
*Examiners.*